US00RE39022E

(19) United States
(12) Reissued Patent
Welsh

(10) Patent Number: US RE39,022 E
(45) Date of Reissued Patent: Mar. 21, 2006

(54) BACKPACK CHAIR

(76) Inventor: Kerry L. Welsh, 4455 Torrance Blvd., Unit #1000, Torrance, CA (US) 90503

(21) Appl. No.: 10/093,903

(22) Filed: Mar. 8, 2002

Related U.S. Patent Documents

Reissue of:
(64) Patent No.: 6,056,172
Issued: May 2, 2000
Appl. No.: 09/234,554
Filed: Jan. 19, 1999

(51) Int. Cl.
*A45F 4/02* (2006.01)

(52) U.S. Cl. ..... 224/155; 224/153; 297/28; 297/129

(58) Field of Classification Search ..... 224/153, 224/154, 155, 156; 297/27, 28, 40, 129, 423.27; D3/217; D12/416
See application file for complete search history.

(56) References Cited

U.S. PATENT DOCUMENTS 2,072,075 A * 2/1937 Travers et al. ..... 297/28
2,201,964 A * 5/1940 Blank ..... 297/27
2,213,590 A * 9/1940 Parry ..... 297/28
2,964,097 A * 12/1960 Moore ..... 297/28
4,487,345 A * 12/1984 Pierce et al. ..... 224/155
4,577,901 A * 3/1986 Phillips ..... 297/17
4,676,548 A * 6/1987 Bradbury ..... 297/129
4,898,421 A * 2/1990 Brunn ..... 297/28
5,297,708 A * 3/1994 Carpenter ..... 224/155
5,409,291 A * 4/1995 Lamb et al. ..... 297/129
5,464,270 A * 11/1995 Chang ..... 297/81
5,527,088 A * 6/1996 MacLean ..... 297/129
5,536,064 A * 7/1996 MacLean ..... 297/129
5,538,318 A * 7/1996 MacLean ..... 297/129
5,547,246 A * 8/1996 Lambert ..... 297/129
5,588,696 A * 12/1996 Jay et al. ..... 297/129
5,611,594 A * 3/1997 Findlay ..... 297/28
5,628,437 A * 5/1997 Kober ..... 224/155
6,095,599 A * 8/2000 Lambert ..... 297/129
6,547,324 B1 * 4/2003 Ammann, Jr. ..... 297/129

* cited by examiner

*Primary Examiner*—Stephen K. Cronin
(74) *Attorney, Agent, or Firm*—Blakely Sokoloff Taylor & Zafman LLP

(57) ABSTRACT

A backpack unit comprising a frame of a material selected from a metal alloy, including, but not limited to, aluminum, aluminum alloy, steel, and steel alloy or plastic. The frame includes a U-shaped seat frame pivotally coupled at its ends to ends of a U-shaped back frame through a cross-member, a U-shaped front leg frame pivotally coupled to the seat panel and pivotally coupled at its ends to ends of a U-shaped back leg frame. The frame is capable of being folded such that the back frame, the seat frame, the front leg frame, and the back leg frame folds substantially parallel and adjacent to one another.

10 Claims, 3 Drawing Sheets

BACKPACK CHAIR

Matter enclosed in heavy brackets [ ] appears in the original patent but forms no part of this reissue specification; matter printed in italics indicates the additions made by reissue.

BACKGROUND OF THE INVENTION

1. Field of the Invention

The invention relates to a portable backpack chair.

2. Background Art

In recent years, the convenience and utility arose of having a folding chair that can be carried around to different locations such as the beach, the park, and sporting events. U.S. Pat. No. 4,487,345 introduced the concept of incorporating a folding chair that, in a collapsed position, includes straps that extend over the shoulders and under the arms of a user so that the user may carry the chair on his or her back. These chairs are made of wood with diagonally extending legs that form an X-shaped coupled to one another through cross-members. Additional wood slats form a seat frame and a back frame, with the seat and back frames pivotally coupled to one another through a cross-member. A canvas panel extends across the seat frame to form a seat for the user. A similar panel extends across the back frame to provide a seat back for the user.

As noted, the above-described backpack chair is made of wood. A consequence of this construction is that the backpack chair is heavy. Accordingly, a provided container or pouch can only be filled with items that will not unduly add to the weight of the chair carried by a user. Thus, the ability to carry other than the lightest outdoor goods such as a volleyball or light picnic items or snacks is limited.

The above-described backpack chair is also not easily adjusted when in an unfolded state and in use by the weight of a user sitting in the chair. It is desirable that a user may wish to have a variety of reclining positions when seated. The backpack chair described in U.S. Pat. No. 4,487,345 offers various recline positions determined by the position of a cross-member that extends beyond the width of the back frame and rests in grooves in the back leg portions of the chair. In order to adjust the reclining position of the chair, a user must generally remove himself or herself from the chair, disengage the cross-member from one groove in the back leg portions, and move the cross-member to a second groove in the leg portions before returning to his or her seat.

What is needed is a lightweight backpack chair that offers the ability to carry more than the lightest outdoor goods and a backpack that is easily adjustable between several reclining positions.

SUMMARY OF THE INVENTION

The invention relates to a backpack unit comprising a frame of a material selected from a metal alloy, including, but not limited to, aluminum, aluminum alloy, steel, and steel alloy, or plastic. The frame includes a U-shaped seat frame pivotally coupled at its ends to ends of a U-shaped back frame through a cross-member, a U-shaped front leg frame pivotally coupled to the seat frame and pivotally coupled at its ends to ends of a U-shaped back leg frame. The frame is capable of being folded such that the back frame, the seat frame, the front leg frame, and the back leg frame fold substantially parallel and adjacent to one another.

The back pack unit of the invention includes a pair of arm rests pivotally coupled to the back frame and positionally coupled along a first diagonal between the ends of the front leg frame and the back leg frame. The pair of arm rests have a plurality of adjustment positions to allow a user to recline to one of many positions when seated in the frame. The backpack unit also includes at least one support panel to support a user when seated in the frame and coupled about the back frame and the seat frame to form a seat within the frame component. A back rest panel adapted to rest against the back of a wearer of the unit is coupled to a back side of the support panel adjacent the seat frame with shoulder straps coupled to the back rest panel to allow the backpack unit to be supported by the shoulders and back of a user. A container having a forward wall panel coupled to the back side of the support panel adjacent to the back frame is also provided to allow a user to carry items, including outdoor goods, in the container with the backpack unit. Because the chair frame is made of a lightweight metal alloy or plastic, the backpack unit of the invention is lightweight. Therefore, the container can be used to carry many more outdoor goods at a comfortable weight to the user than the backpack chair described in U.S. Pat. No. 4,487,345.

As noted, the backpack unit includes a pair of arm rests that have a plurality of adjustment positions. The position of the arm rest is adjusted by the displacement of the arm rest from the first diagonal to a second diagonal, the rotation of the back frame, and the return of the arm rest to the first diagonal. The support panel provided is configured at a tension such that, with the weight of the user on the support panel above the seat frame, the back frame rotates when the pair of arm rests are displaced to the second diagonal. In this manner, a user seated on the seat frame of the backpack unit can adjust the recline position of the chair formed by the frame, without removing himself or herself from the seat frame.

Other embodiments, features, and advantages of the invention will become apparent in light of the following description thereof.

DETAILED DESCRIPTION OF THE INVENTION

Figure 1:
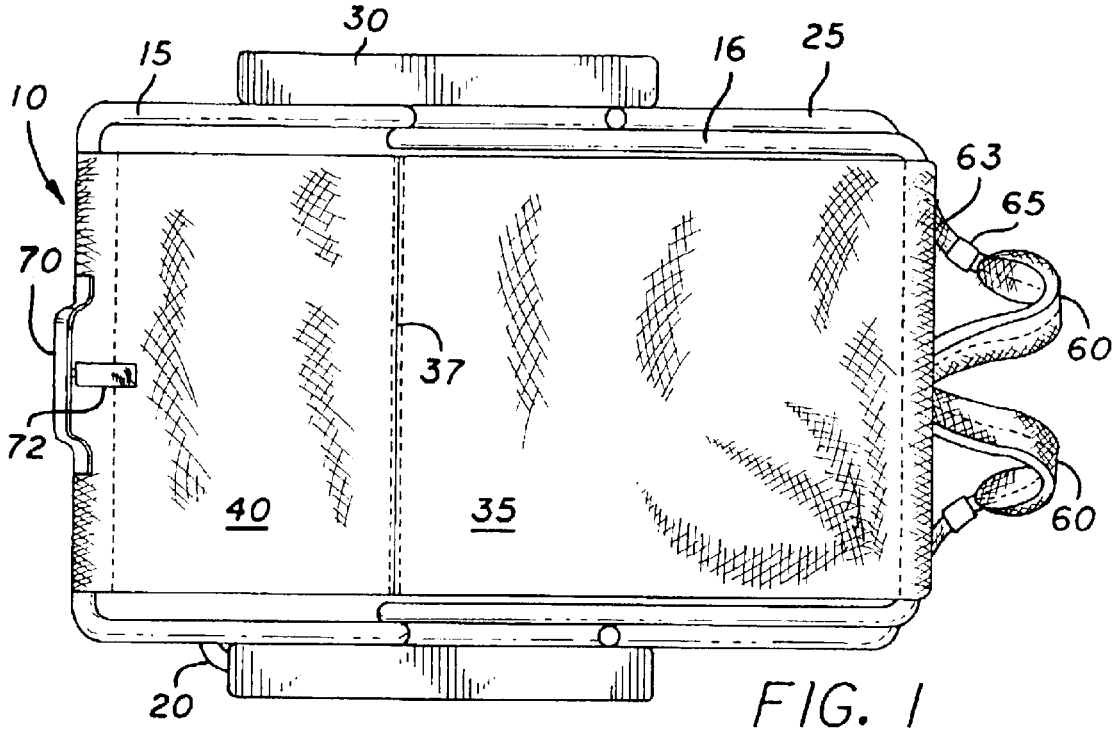
FIG. 1 is a top view of an embodiment of the backpack unit of the invention in an unfolded state.
Figure 2:
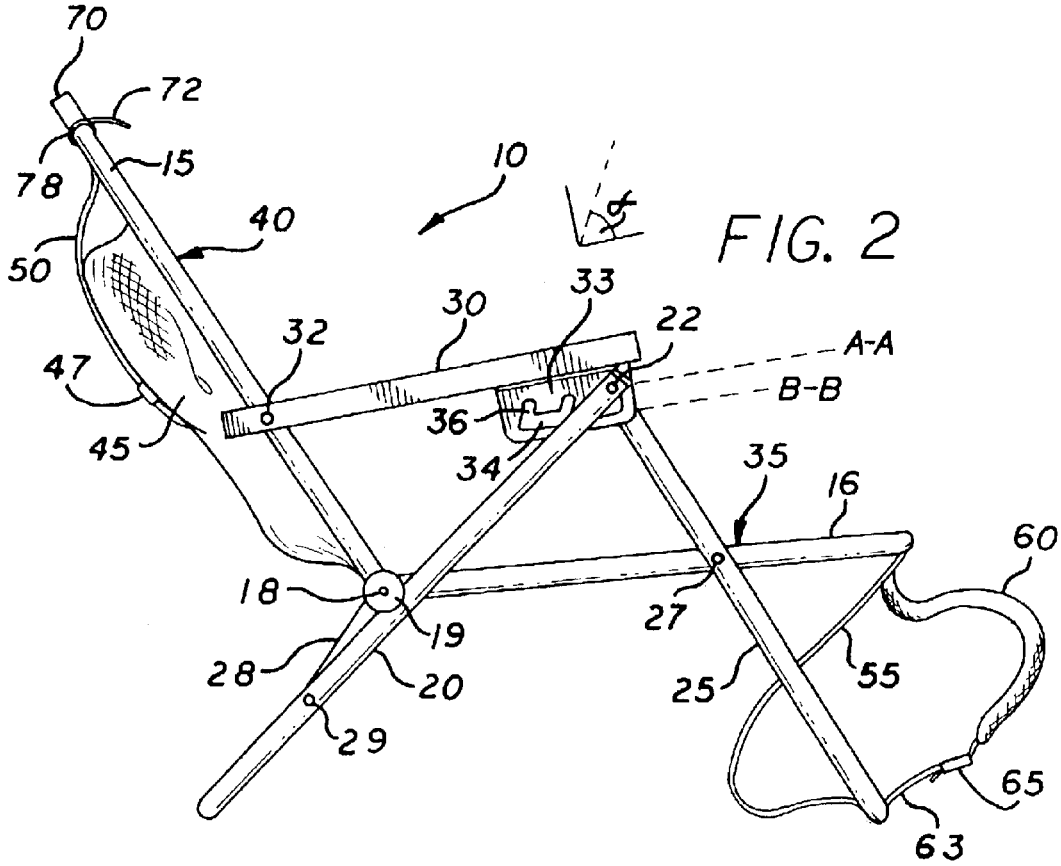
FIG. 2 is a side view of an embodiment of the backpack unit of the invention in an unfolded state.
Figure 4:
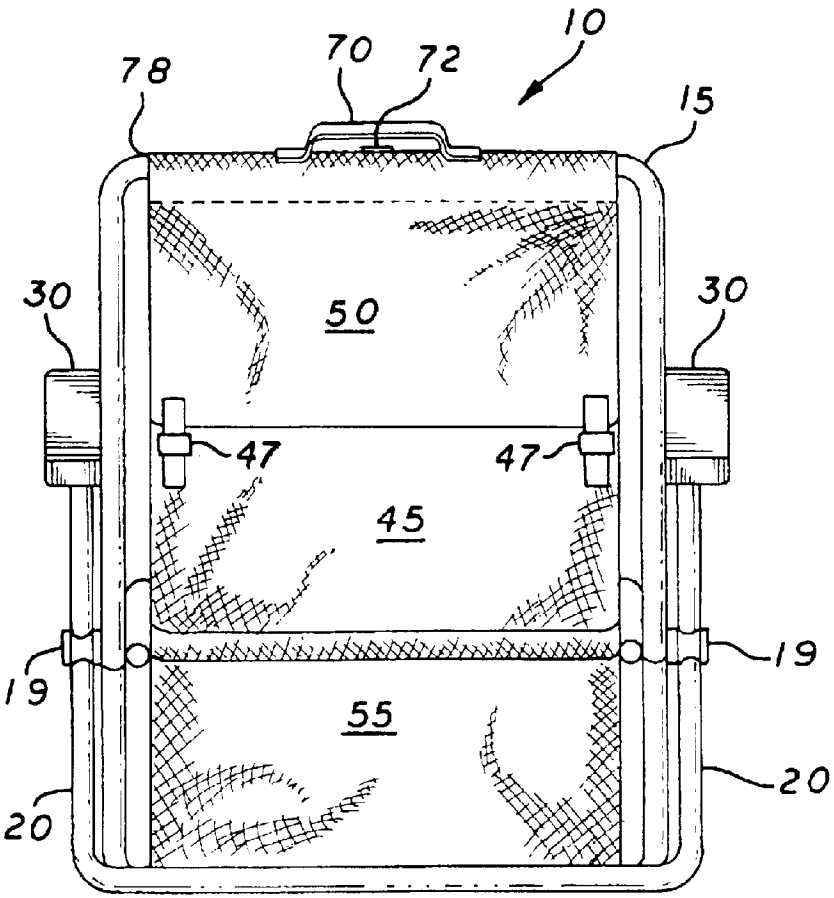
FIG. 4 is a back side view of an embodiment of the back pack unit of the invention in an unfolded state.
Figure 3:
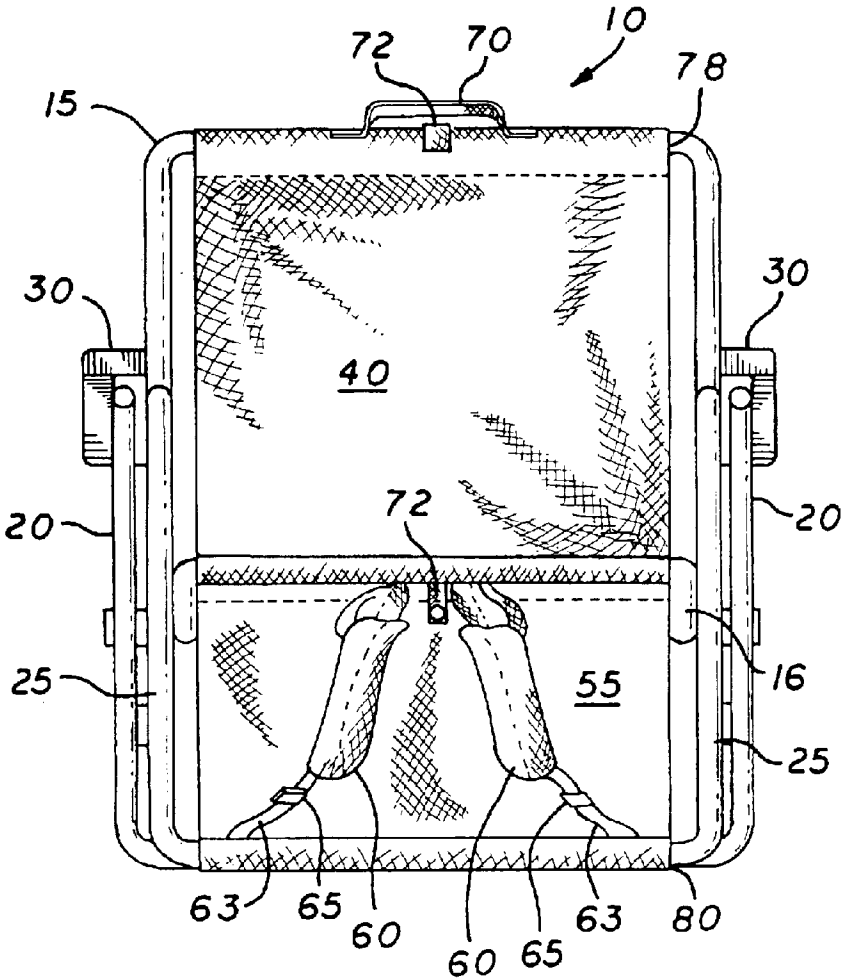
FIG. 3 is a front side view of an embodiment of the backpack unit of the invention in an unfolded state.
Figure 5:
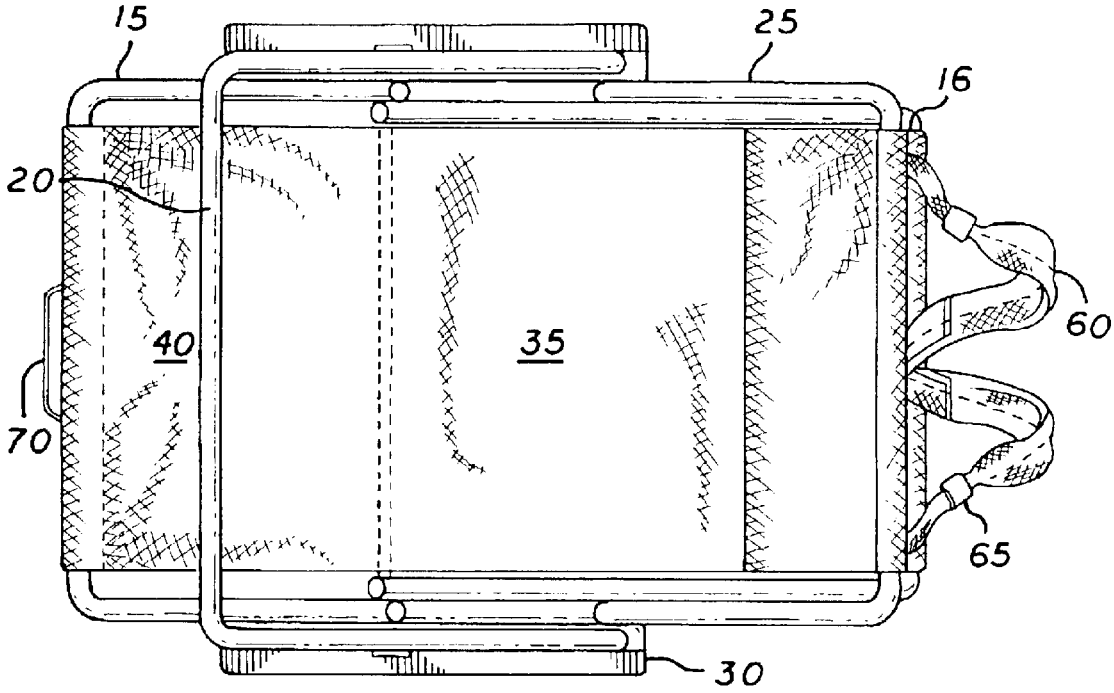
FIG. 5 is a bottom side view of an embodiment of the back pack unit of the invention in an unfolded state.

The invention relates to a backpack unit that includes a foldable frame that can function as a chair. In this manner, the backpack unit of the invention offers a folding chair that can be easily carried over the shoulders of a user to various locations, including outdoor activities, like athletic events or the beach or a park.

The frame of the backpack unit that forms the foldable chair portion of the unit is made of a lightweight, durable material, including, but not limited to, a metal alloy, such as aluminum, aluminum alloy, steel, steel alloy, or a plastic material. In this manner, the frame of the backpack unit is preferably a lightweight material so that the weight of the backpack unit is light enough to allow the unit to serve a second function as a container for carrying more than nominally-weighted goods. Thus, the backpack unit includes a container portion that allows for the storage and transport of a variety of goods, including sporting equipment and picnic supplies.

In one embodiment, the frame of the backpack unit is in the form of a folding chair including a U-shaped seat frame pivotally coupled at its ends to ends of a U-shaped back frame through a cross-member, a U-shaped front leg frame pivotally coupled to the seat frame and pivotally coupled at its ends to ends of a U-shaped back leg frame. The frame is capable of being folded such that the back frame, the seat frame, the front leg frame, and the back leg frame fold substantially parallel and adjacent to one another.

The backpack unit also includes a pair of arm rests pivotally coupled to the back frame and positionally coupled along a first diagonal between the ends of the front leg frame and the back leg frame. The pair of arm rests have a plurality of adjustment positions to allow a user seated in the frame of the folding chair to adjust the recline position of the chair. At least one support panel to support a user is coupled about the back frame and the seat frame through the cross-member to provide a seat with a back rest for the user when the frame is in unfolded state. Coupled to a back side of the support panel adjacent to the seat frame is a back rest panel adapted to rest against the back of a user of the unit when carried over the shoulders of the user. Shoulder straps are coupled to the back rest panel to allow the back pack unit to be worn over the shoulders of a user when the chair is in a folded state. A container having a forward wall panel is coupled to the back side of the support panel adjacent to the back frame. The container allows the storage of goods, including but not limited to sporting equipment and picnic supplies, between the forward wall panel and the support panel.

When in use as a chair, the back pack unit of the invention is configured such that the position of the arm rest may be adjusted by the displacement of the arm rest while a user is seated in the chair. To adjust the recline position of a chair by the rotation of the back frame, a user displaces the arm rest from a first diagonal to a second diagonal, rotates the back frame, and returns the arm rest to the first diagonal. These steps may be taken without the user removing himself or herself from the chair. In one embodiment, the support panel is provided at a tension such that with the weight of the user on the support panel above the seat frame, the back frame rotates without effort when the pair of arm rests are displaced to the second diagonal.

Figure 6:
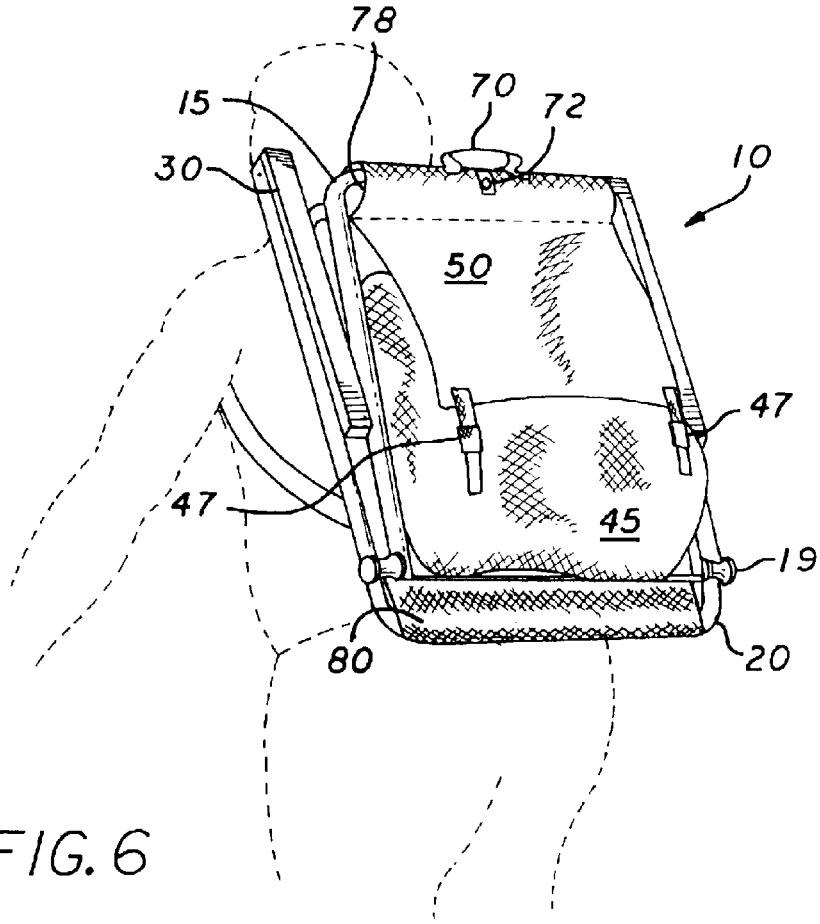
FIG. 6 is a perspective top view of an embodiment of the back pack unit of the invention in a folded state.

FIGS. 1–6 present an embodiment of the backpack unit of the invention. FIGS. 1–5 show the embodiment of the backpack unit of the invention in an unfolded state such that the backpack unit may be used as a chair. FIG. 6 shows the backpack unit of the invention in a folded state and adapted to be carried over the shoulders of a user.

In the embodiment shown in the figures, backpack unit 10 consists of a frame in the form of a folding chair. The frame is of a lightweight material including, but not limited to, metal alloy or plastic. Suitable metal alloys include but are not limited to aluminum, aluminum alloy, steel, and steel alloy. The frame includes U-shaped seat frame 16 pivotally coupled at its ends to the ends of U-shaped back frame 15 through cross-member 18. In this manner, U-shaped back frame 15 is adapted to rotate about cross-member 18. Cross-member 18 is for example a lightweight metal alloy rod that extends the width of U-shaped back frame 15 and is coupled to the ends of U-shaped back frame 15 and U-shaped seat frame 16. The frame also includes U-shaped front leg frame 25 coupled at its ends to the ends of U-shaped back leg frame 20 through separate cross-members 22 to form a rotational axis. Cross-members 22 are, for example, cylindrical rivets, screws, bolts, or other suitable fasteners. Cross-members 22 are coupled at respective ends of U-shaped front leg frame 25 and U-shaped back leg frame 20. In one embodiment, the width of each of back frame 15, seat frame 16, and back leg frame 20 have different widths and the width of front leg frame 25 and back frame 15 are substantially similar. In this manner, in a folded state, each of the components of the frame are substantially parallel and adjacent to one another with back leg frame 20 being widest, followed by back frame 15 and front leg frame 25, and seat frame 16.

In one embodiment, front leg frame 25 is rotatably coupled to seat frame 16 at point 27 substantially between the ends and the apex of front leg frame 25 and the ends and apex of seat frame 16. In one embodiment, concave-shaped rollers 19 extend from the end of cross-member 18. Concave-shaped rollers 19 are configured to abut back leg frame 20 when back frame 15 of the frame is in an unfolded state. In this manner, cross-member 18 supports back frame 15 by displacing a downward force onto back leg frame 20 to limit the rotation of back frame 15 about cross-member 18. Support members 28 may be added to either side of the back leg frame 20 and coupled to cross-member 18 to further support back frame 15 when the frame is in an unfolded state.

The frame of the backpack unit of the invention also includes a pair of arm rests 30 pivotally coupled at one end (indicated by reference numeral 32) to back frame 15 and positionally coupled to the ends of back leg frame 20 and front leg frame 25. The arm rests are made of a durable material that is comfortable to the exposed arms of a user. Suitable material includes, but is not limited to, plastic and wood. In one embodiment, inferiorly extending plates 33 are coupled to the base of each arm rest 30. Plates 33 are individually coupled to cross-members 22. In one embodiment, plates 33 extend about cross-members 22 between the outer back leg frame 20 and the inner front leg frame 25. Each plate 33 has opening 34 substantially extending about the plate length with a plurality of laterally extending openings 36 branching from opening 34 at an approximate 30°–90° angle (see angle, FIG. 2). In this manner, opening 34 and laterally extending openings 36 define two diagonals. The first diagonal (denoted by line A—A in FIG. 2) defines an adjustment position for arm rest 30 that similarly defines a position for back frame 15. The position is defined by cross-members 22 resting at the apex of one lateral opening 36 of plates 33. To change the position, arm rests 30 are translated to a second diagonal (denoted by line B—B in FIG. 2) wherein cross-members 22 are aligned with the base of opening 34. At this point, back frame 15 is rotated causing arm rests 30 to be displaced toward or away from the apex of seat frame 16. Plates 33 move about cross-member 22 through the second diagonal to allow its displacement. At one of the reclining positions designated by lateral openings 36 in plate 33, arm rests 30 are displaced laterally to position cross-members 22 in the designated lateral opening 36 (i.e., to place arm rest 30 along the first diagonal represented by line A—A). As will be described below, the configuration of an embodiment of the back pack unit of the invention allows the displacement of arm rest 30 and thus the reclining position of the folding frame to be adjusted while a user is seated in the frame.

Thus, laterally extending openings 36 are preferrably at an angle of approximately 45°–60° (angle ) to facilitate the adjustment of back frame 15. As angle C approaches 90° it may become more difficult to adjust the reclining position while a user is seated in the frame. As angle approaches angle less than about 30°, cross-members 22 may become dislodged from the desired laterally extending opening 36 in response to the tension created by a user sitting on seat support panel 35.

Arm rests 30 are rotatably coupled substantially about midpoint (indicated by reference numeral 32) between the apex and ends of back frame 15. The rotatable coupling allows arm rests 30 to collapse and be rotated so that when the chair is in a folded state, arm rests 30 are substantially parallel to back frame 15.

In addition to the frame of the backpack unit of an embodiment of the invention, the unit includes at least one support panel to support a user seated within the frame. In one embodiment, the support panel is made of a durable material such as canvas (e.g., 600 Denier canvas), or polyester, or other cloth or cloth-like material. In the embodiment where the support panel is a canvas material, the canvas is coupled to the apex of back frame 15 and the apex of seat frame 16. The coupling may be accomplished by looping the canvas material, for example, over the apex of back frame 15 and sewing the looped portion to the back side of the support panel. A similar sewing procedure may be used to couple the support panel to the apex of seat frame 16. In one embodiment, the support panel is made up of seat support panel 35 and back support panel 40. Seat support panel 35 is coupled, such as described above, to the apex of seat frame 16. Seat panel 35 is also coupled at its other end 37 in a similar fashion to cross-member 18 and is coupled at a tension to support an average user of the frame as a chair. Back support 40 is coupled, such as described above, to the apex of back frame 15 and is coupled at its other end to seat panel 35, such as for example, by sewing. Back support panel 40 is also coupled at a tension to support an average user of the frame as a chair.

A further consideration for coupling the support panel to the frame to provide a seating surface for a user of the frame as a chair, is that seat support panel 35 and back support panel 40 are coupled at a tension to facilitate the rotation of back frame 15 to adjust the recline position of back frame 15 when a user is seated in the frame. In this manner, when a user, seated in the frame, displaces arm rests 30 from the first diagonal (diagonal A—A in FIG. 2) to the second diagonal (diagonal B—B in FIG. 2), the back frame 15 rotates without user aid. To facilitate such rotation, a user should displace the ordinary force directed against back frame 15 such as by "sitting up." In one embodiment, a 15 inch by 16 inch seat support panel 35 is coupled to back support panel 40 at a tension such that, in response to a force of approximately 0.10–0.40 pounds per square inch, seat support panel 35 deflects approximately ¼ inch to ½ inch in a direction normal to seat support panel 35. It is to be appreciated that a person of skill in the art, and with an understanding of this objective of the invention, can configure the support panel(s) with sufficient tension to accomplish uninitiated movement of back frame 15 when arm rests 30 are brought to the second diagonal.

In one embodiment, a head rest is provided along the apex of back frame 15. Head rest 78 is, for example, a foam such as a polystyrene foam, extending above the apex of back frame 15 and beneath back panel 40. Head rest 78 cushions the head or shoulder of a user seated in the frame.

Coupled to the back side of back panel 40, in one embodiment, is container unit 45. In one embodiment, container unit 45 is made of the same material as the support panel (i.e., seat panel 35 and back panel 40). Container unit 45 is configured to provide an opening between container unit 45 and the back side of back panel 40. In one embodiment, container unit 45 contains a sufficient cavity or container to allow the storage and transport of various goods, such as sporting equipment and picnic supplies. Overlying container unit 45 and coupled, in one embodiment, to back panel 40 is container flap 50. Container flap 50 should be of a sufficient area to extend over the opening defined by container unit 45. In one embodiment, container flap 50 may be detachably coupled to container unit 45 by providing releasable fasteners such as male/female snap-release buckles 47 connected or coupled, such as for example, by sewing to each of container flap 50 and container unit 45.

In the embodiment of the backpack unit shown in the figures, the inner wall of container unit 45 contains a sealable pouch to store small items. Methods of sealing such a pouch includes hook-and-loop type fasteners and zippers.

In one embodiment, back rest panel 55 is provided to support the carrying of the backpack unit of the invention over the shoulders and on the back of the user. Back rest panel 55 is coupled to the under side of seat panel 35 such as, for example, by sewing and is coupled about the apex and front leg frame 25 such as, for example, by sewing. Cushion element 80, for example, a polystyrene foam, may also be provided about the apex of front leg frame 25 to serve as a cushion to the lower back of a user when the backpack unit is worn over the shoulders of a user. Coupled to one side of back support panel 55 are a pair of adjustable straps 60. In one embodiment, the top of the straps 60 are coupled such as, for example, by sewing at a point adjacent the apex of seat frame 16 below seat panel 35. A second end of straps 60 are coupled adjacent to the apex of front leg frame 25. Straps 60 typically have a cushion element and a strap element 63. Straps 60 are adjustable through a conventional buckle 65 such as used in other lightweight backpack configurations.

As shown in FIG. 6, the backpack unit of the invention may be worn as a backpack over the shoulders of a user. FIG. 6 shows an embodiment of the unit with the frame in a folded state and arm rests 30 lying substantially parallel to the individual frame units. In this example, container flap 50 overlies and is coupled to container unit 45 to protect items stored in container unit 45. A handle 70 is coupled such as, for example, by sewing to back support panel 40 at the apex of back frame 15. Fastener 72 such as a snap-release buckle may be provided adjacent the apex of back frame 15 and the apex of seat frame 16 such as, for example, by sewing one end to back panel 40 and the other to the under side of seat panel 35. In this manner, when the frame of backpack unit 10 is in a folded position, the backpack unit may be coupled together.

In the preceding detailed description, the invention is described with reference to specific embodiments thereof. It will, however, be evident that various modifications and changes may be made thereto without departing from the broader spirit and scope of the invention as set forth in the claims. The specification and drawings are, accordingly, to be regarded in an illustrative rather than a restrictive sense.

What is claimed is:

1. A backpack unit comprising:

a frame of a material selected from one of a metal alloy and a plastic in the form of a folding chair including a U-shaped seat frame pivotally coupled at its ends to ends of a U-shaped back frame through a cross-member, a U-shaped front leg frame pivotally coupled to the seat frame and pivotally coupled at its ends to ends of a U-shaped back leg frame, the frame capable of being folded such that the back frame, the seat frame, the front leg frame, and the back leg frame fold substantially parallel and adjacent to one another;

a pair of arm rests pivotally coupled to the back frame and positionally coupled along a first diagonal between the ends of the front leg frame and the back leg frame, the pair of arm rests having a plurality of adjustment positions, *a pivotal coupling of the ends of the front leg frame and the back leg frame disposed through one of the plurality of adjustment positions*;

at least one support panel to support a user coupled about the back frame and the seat frame and associated with the cross-member;

a back rest panel adapted to rest against the back of a wearer of the unit coupled to a back side of the at least one support panel adjacent the seat frame;

shoulder straps coupled to the back rest panel;

a container having a forward wall panel coupled to the back side of the at least one support panel adjacent the back frame, wherein the position of the arm rests is adjusted by the displacement of the arm rests to a second diagonal, the rotation of the back frame, and the return of the arm rests to the first diagonal, wherein the at least one support panel is at a tension such that with the weight of a user on the support panel about the seat frame, the back frame rotates when the pair of arm rests are displaced to the second diagonal.

2. The backpack unit of claim 1, wherein the plurality of adjustment positions are defined by a plate coupled to a base of each arm rest, each plate having an opening substantially extending about its length that defines the second diagonal and a plurality of laterally extending openings, the top of each laterally extending opening defining the first diagonal.

3. The backpack unit of claim 2, wherein the ends of the front leg frame and the ends of the back leg frame are respectively coupled by a pair of leg cross-members and the arm rest plates extend and are respectively coupled about the leg cross-members between the ends of the front leg frame and the ends of the back leg frame.

4. The backpack unit of claim 1, wherein the support panel comprises a seat support panel and a back support panel.

5. The backpack unit of claim 1, wherein the width of each of the seat frame, the back frame, and the back leg frame have a different width.

6. The backpack unit of claim 5, wherein the width of the front leg frame and the back frame are substantially similar.

7. The backpack unit of claim 6, wherein the width of the back leg frame is greater than each of the width of the seat frame and the width of the back frame.

8. The backpack unit of claim 1, further comprising a container cover coupled to the back side of the support panel and extending over a portion of the container, the container cover having fasteners to releasably engage the container cover to the container.

9. The backpack unit of claim 1, further comprising one of a male and a female fastener coupled to the back side of the support panel at an apex of the seat frame and the other of a male and female fastener coupled to the back side of the support panel at an apex of the back frame to releasably engage the one fastener.

*10. A backpack unit comprising:*

*a frame of material selected from one of a metal alloy and a plastic in the form of a folding chair including a U-shaped seat frame pivotally coupled at its ends to ends of a U-shaped back frame through a cross-member, a U-shaped front leg frame pivotally coupled to the seat frame and pivotally coupled at its ends to ends of a U-shaped back leg frame, the frame capable of being folded such that the back frame, the seat frame, the front leg frame, and the back leg frame fold substantially parallel and adjacent to one another;*

*a pair of arm rests pivotally coupled to the back frame and positionally coupled along a first diagonal between the ends of the front leg frame and the back leg frame, the pair of arm rests having a plurality of adjustment positions, a pivotal coupling of the ends of the front leg frame and back leg frame disposed through one of the plurality of adjustment positions;*

*a first panel coupled to the back frame;*

*a second panel coupled to the seat frame;*

*a pair of shoulder straps coupled to the second panel; and*

*a container having a forward wall panel coupled to a back side of the first panel adjacent the back frame,*

*wherein the position of the arm rests is adjusted by the displacement of the arm rests to a second diagonal, the rotation of the back frame, and the return of the arm rests to the first diagonal,*

*wherein the second panel is at tension such that with the weight of a user on the second panel about the seat frame, the back frame rotates when the pair of arm rests are displaced to the second diagonal.*

* * * * *